United States Patent [19]

Bolash

[11] Patent Number: 5,084,666
[45] Date of Patent: Jan. 28, 1992

[54] SWITCHABLE OUTPUT VOLTAGE CONVERTER

[75] Inventor: John P. Bolash, Lexington, Ky.

[73] Assignee: International Business Machines Corporation, Armonk, N.Y.

[21] Appl. No.: 602,023

[22] Filed: Oct. 23, 1990

[51] Int. Cl.[5] .................................... G05F 1/445
[52] U.S. Cl. ...................... 323/283; 363/21; 323/281; 323/267
[58] Field of Search .............. 363/21; 323/281, 352, 323/353, 354, 283, 284, 267, 351; 307/571, 360, 584

[56] References Cited

U.S. PATENT DOCUMENTS

| 4,321,525 | 3/1982 | Imazeki et al. | 323/281 |
|---|---|---|---|
| 4,388,587 | 6/1983 | Lamoth et al. | 323/283 |
| 4,460,949 | 7/1984 | Steigerwald | 363/28 |
| 4,569,009 | 2/1986 | Genuit | 363/28 |
| 4,594,501 | 1/1986 | Culley et al. | 219/492 |
| 4,598,243 | 7/1987 | Kawakami | 323/349 |
| 4,639,659 | 1/1987 | Okanobu | 323/224 |
| 4,677,534 | 6/1987 | Okochi | 363/21 |
| 4,700,125 | 10/1987 | Takata et al. | 323/317 |
| 4,755,739 | 7/1988 | Van Buul | 323/222 |
| 4,816,739 | 3/1989 | Sakurai et al. | 323/272 |
| 4,853,612 | 8/1989 | Kobayashi | 323/354 |
| 4,885,674 | 12/1989 | Varga et al. | 363/21 |
| 4,893,228 | 1/1990 | Orrick et al. | 363/89 |
| 4,896,254 | 1/1990 | Bennett | 363/50 |

FOREIGN PATENT DOCUMENTS 3631932A 4/1987 Fed. Rep. of Germany .
0141727 9/1982 Japan ................................ 363/21

Primary Examiner—Steven L. Stephan
Assistant Examiner—Ben M. Davidson
Attorney, Agent, or Firm—Calfee Halter & Griswold

[57] ABSTRACT

A voltage converter having switchable output capability is provided. The voltage converter converts an unregulated voltage input to a regulated DC voltage output. The regulated DC output level is selectable by changing the logical status of at least one logic input to the voltage converter, thereby converting a single voltage source to one of at least two selectable DC voltage outputs.

16 Claims, 2 Drawing Sheets

SWITCHABLE OUTPUT VOLTAGE CONVERTER

BACKGROUND OF THE INVENTION

The present invention relates to a multiple output power source, and more particularly to a switchable output voltage converter providing selectable DC output voltage levels.

Electrical or electronic devices and systems often require power sources capable of providing a plurality of DC output voltage levels. Often, a single power source is used to provide these outputs. Typically, these power sources have a number of output terminals supplying the required voltage levels simultaneously. If, however, it is not necessary to output the required voltage levels simultaneously, a single output terminal is sufficient. Means must be provided, therefore, to select and vary the voltage level outputted at this terminal.

In a device such as that shown in U.S. Pat. No. 4,569,009 to Genuit, a power supply for providing a selectable predetermined regulated output voltage is disclosed. A switching regulator circuit converts an input voltage to a DC output voltage and a control circuit, which senses the output voltage, controls the conversion of the switching regulator circuit. An amplifier having selectable gain values is interposed between the control circuit and the output terminal of the power supply. In this manner, a predetermined portion of the output voltage is used as feedback to the control circuit, permitting selective determination of the output voltage without altering the switching regulator circuit or the control circuit.

Although Genuit can supply a plurality of output voltage levels without necessitating changes to either the switching regulator circuit or the control circuit, the gain of the feedback amplifier must be altered. The feedback resistors are selectably connected across the amplifier by means of switches to accomplish the required gain change. Alternatively, the amplifier gain may be altered by installing jumpers across various points in the feedback resistor network. In either of these instances, the required amplifier gain change is accomplished through manual means of installing the jumpers or changing the switch positions.

U.S. Pat. No. 4,677,534 to Okochi discloses a multiple output power source capable of generating both AC and DC output voltages. A pulse width modulator compares a triangle wave from an oscillator with an error voltage from a differential amplifier. The pulse width modulator output drives a switching transistor in a manner which controls the DC voltage output level. However, no means are provided for selectively determining a plurality of DC output voltage levels.

U.S. Pat. No. 4,460,949 to Steigerwald discloses a DC-DC converter driven by an inverter providing square waves of current to a parallel resonant circuit. By varying the frequency at which the inverter switches turn ON and OFF, the output of the parallel resonant circuit is altered. This output is then rectified to provide the DC output voltage. Steigerwald, however, provides no means to selectively choose one of a predetermined number of DC output voltage levels.

Thus, there is a need for a voltage converter capable of outputting any one of a plurality of selectable DC voltage levels without requiring manual manipulation of circuit components. The present invention addresses this need.

SUMMARY OF THE INVENTION

According to the present invention, a switchable output voltage converter is provided which converts an unregulated voltage input to a regulated DC output. The regulated DC output level is selectable by means of at least one digital logic input to the converter. Altering the status of a digital logic input permits real time control of the voltage converter output.

The regulated DC output voltage level depends on the value of a reference voltage fed into the converter, in addition to the status of the digital logic input. An error amplifier compares a portion of the present output voltage with a portion of the reference voltage and outputs an error voltage. A pulse width modulator compares this error voltage to a sawtooth waveform and outputs a pulse waveform which varies the duty cycle of a switching transistor to maintain the output voltage at its desired level.

The output voltage of the converter circuit is linearly related to the portion of the reference voltage fed into the error amplifier. This portion of the reference voltage can be altered to obtain a particular output voltage by the use of an incrementally variable resistance network. The resistance network comprises a digital logic input, a resistor, a field effect transistor (FET) switch, and an inverter. The FET is turned ON or OFF by the digital logic input fed into the inverter. Thus, by selectably alternating the digital logic input between LOW and HIGH, the portion of the reference voltage fed into the error amplifier is altered. Because the output voltage is linearly related to this portion of the reference voltage, one of two output voltages can be selected by changing the state of the digital logic input.

More than two output voltage levels are selectable by adding a second resistor, FET switch, inverter and digital logic input. Such an arrangement would provide for four possible logic input combinations and, hence, four possible values for the proportion of reference voltage fed back into the error amplifier. In this manner, the status of the two digital logic inputs will determine which one of four output voltage levels is obtained. The voltage converter circuit is expandable in a similar manner by adding additional resistors, FET switches, inverters and digital logic inputs. In general, the converter is capable of providing any one of $2^n$ different output voltages where n equals the number of digital logic inputs.

DESCRIPTION OF THE PREFERRED EMBODIMENT(S)

Figure 1:
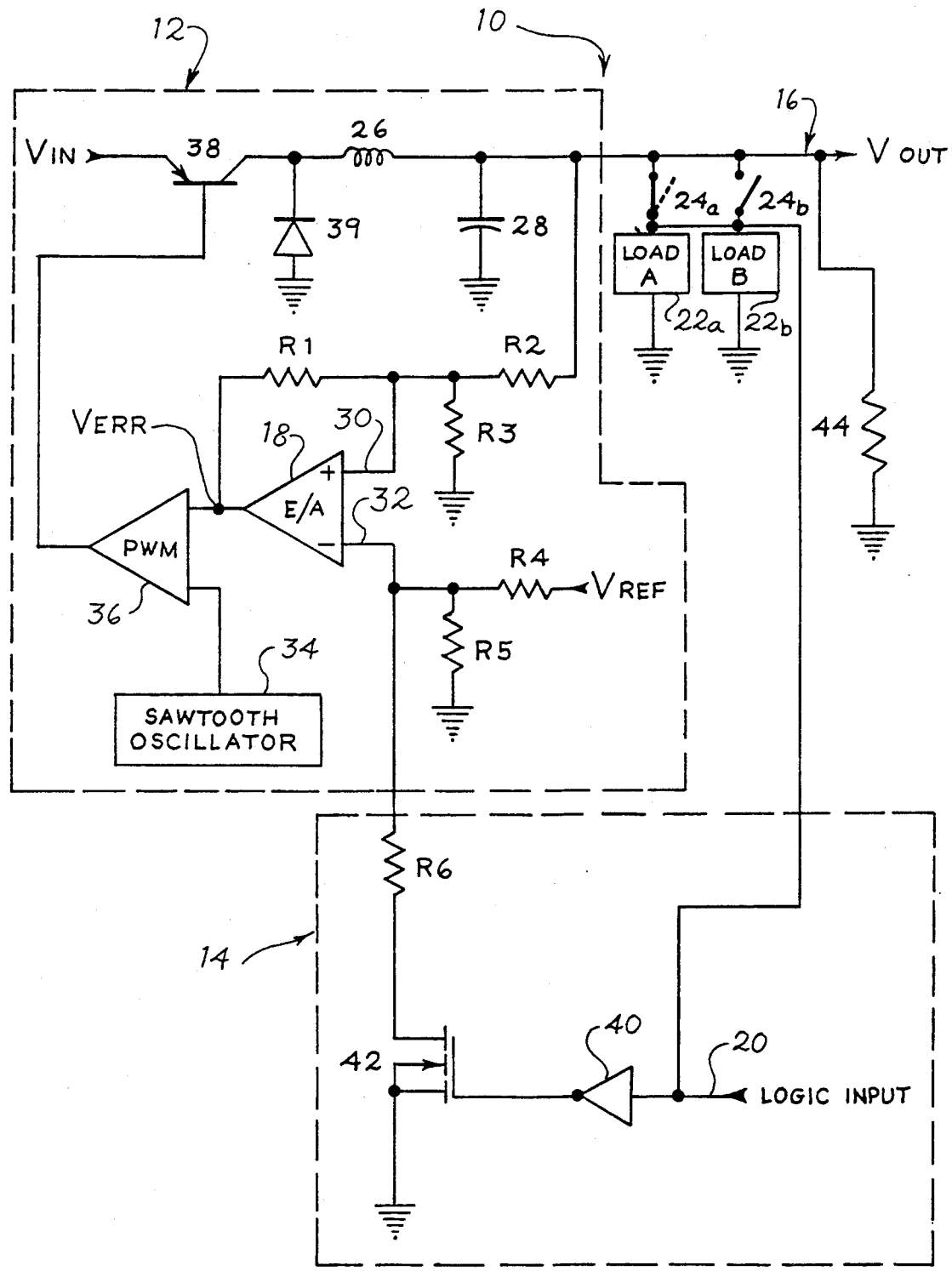
FIG. 1 is a circuit schematic of one embodiment of a switchable output voltage converter according to the present invention.

Referring now to the drawings, a switchable output voltage converter according to the present invention is shown.

FIG. 1 is a schematic illustration of a switchable output voltage converter circuit 10. The converter circuit 10 comprises a control circuit 12 and an output selector circuit 14. The control circuit 12 provides an output voltage (shown as $V_{OUT}$) at an output terminal 16 of the control circuit which is linearly related to a portion of a reference voltage (shown as $V_{REF}$) fed into an error amplifier 18 of the control circuit. This portion of the reference voltage can be altered to obtain a particular output voltage by enabling the output selection circuit 14. By selectably alternating a digital logic input 20 between LOW and HIGH, the portion of the reference voltage fed into the error amplifier 18 is altered. Because the output voltage is linearly related to this portion of the reference voltage, one of two specific output voltages can be selected by changing the state of the digital logic input 20. In this manner, the same input voltage (shown as $V_{IN}$) can be used to power either a first load 22a or a second load 22b which are selectably but not simultaneously connected to the output terminal 16 of the converter circuit 10. The selection of the load to be connected to the output terminal is provided by switches 24a and 24b and means to operate the switches simultaneously with changes in the logic level of the digital logic input 20.

The control circuit 12 converts the unregulated input voltage to a regulated output voltage and maintains the voltage at a desired level. Typically, the unregulated input voltage is in the form of a rectified AC voltage waveform and is of greater amplitude than either of the two selectable output voltages. The rectified voltage waveform is smoothed by an inductor 26 and a capacitor 28 to provide the regulated DC output voltage in a well known manner.

The error amplifier 18 of the control circuit 12 compares portions of the output voltage and reference voltage and outputs an error voltage. Resistor R1 acts as a feedback resistor for the error amplifier. Resistor R1 is typically in the range of 100K ohms and provides a means of stabilizing the operation of the error amplifier 18. A fractional portion of the regulated output voltage is fed into a first input 30 of the error amplifier 18 through a first pair of input resistors R2 and R3, each having a resistance less than 10K ohms. This fractional portion of the output voltage equals R3/(R2+R3) of the output voltage, because the resistance value of R1 is so much greater than that of R3. A fractional portion of the reference voltage is similarly fed into a second input 32 of the error amplifier 18 through a second pair of input resistors R4 and R5, each having a resistance of less than 10K ohms. This fractional portion equals R5/(R4+R5) of the reference voltage. The error amplifier compares these two voltages and outputs an error voltage (shown as $V_{ERR}$) representing the difference between these two voltages.

The error voltage and a sawtooth waveform outputted by a sawtooth oscillator 34 are compared by a pulse width modulator 36. The pulse width modulator 36 converts the sawtooth waveform to pulses of the same frequency as the sawtooth waveform. The pulse width is varied in response to the error voltage and is supplied to the base of a switching transistor 38. The pulse width is shortened if the error amplifier indicates that the output voltage is too high, and is lengthened if a low voltage is indicated. The pulse width modulator thus controls the duty cycle of transistor 38 which determines the average value of unregulated voltage fed into the inductor-capacitor filter. A diode 39 allows stored current in the inductor 26 to flow to ground at any time transistor 38 is turned OFF. The diode 39 does not conduct during times at which the transistor is switched ON. In this manner, the control circuit 10 is able to maintain the output voltage at its desired level. The output voltage is represented by the following equation:

$$V_{OUT} = \frac{(R2 + R3)}{(R3)} \cdot \frac{(R5 \cdot V_{REF})}{(R4 + R5)} \quad 1)$$

The output selection circuit 14 provides means to control the output so that one of two output voltages can be supplied to either of two electrical loads 22a or 22b. The output selection circuit 14 comprises a digital logic input 20, an inverter 40, a field effect transistor (FET) 42, and a resistor R6.

The status of the digital logic input 20 determines whether the output selection circuit 14 is activated or deactivated. If the status of the digital logic input is HIGH, the inverter 40 inverts the HIGH to LOW and the FET 42 remains OFF. Resistor R6 does not affect the operation of the control circuit 12 because it draws no current, and the output of the inverter circuit 10 is represented by equation 1 above.

The output selection circuit 14 is activated by a LOW digital logic input 20. The LOW input is inverted to a HIGH by the inverter 40, thereby turning FET 42 ON. Resistor R6 begins to draw current, and the voltage level at the second input 32 to the error amplifier 16 is lowered. The error amplifier 18 responds by outputting an error voltage representing the voltage differential present between the first input 30 and the second input 32. The pulse width modulator in turn responds to this error voltage by shortening the pulse width of its output to reduce the duty cycle of transistor 38. The average value of unregulated voltage fed into the inductor-capacitor filter is thus lowered, thereby reducing the level of the output voltage. The output voltage of the converter circuit 10 when the digital logic input is LOW is represented by the following equation:

$$V_{OUT} = \frac{(R2 + R3)}{(R3)} \cdot \frac{\frac{(R5 \cdot R6)}{(R5 + R6)}}{(R4 + \frac{(R5 \cdot R6)}{(R5 + R6)})} \cdot V_{REF} \quad 2)$$

Thus, a LOW logic input to the output selection circuit 14 effectively reduces the portion of the reference voltage fed into the second input 32 to the error amplifier 18. Because the output voltage of the converter circuit 10 is linearly related to this portion of the reference voltage, as shown by equations 1 and 2, one of the two output voltages represented by these equations is selectable by changing the state of the digital logic input 20. In this manner, selective determination of the converter circuit output is provided by the digital logic input without necessitating changes to component values in either the control circuit 12 or the output selection circuit 14. In addition, means are provided to operate switches 24a and 24b simultaneously with changes in the digital logic input to select whether load 22a or 22b is to be connected to the output terminal 16.

Figure 2:
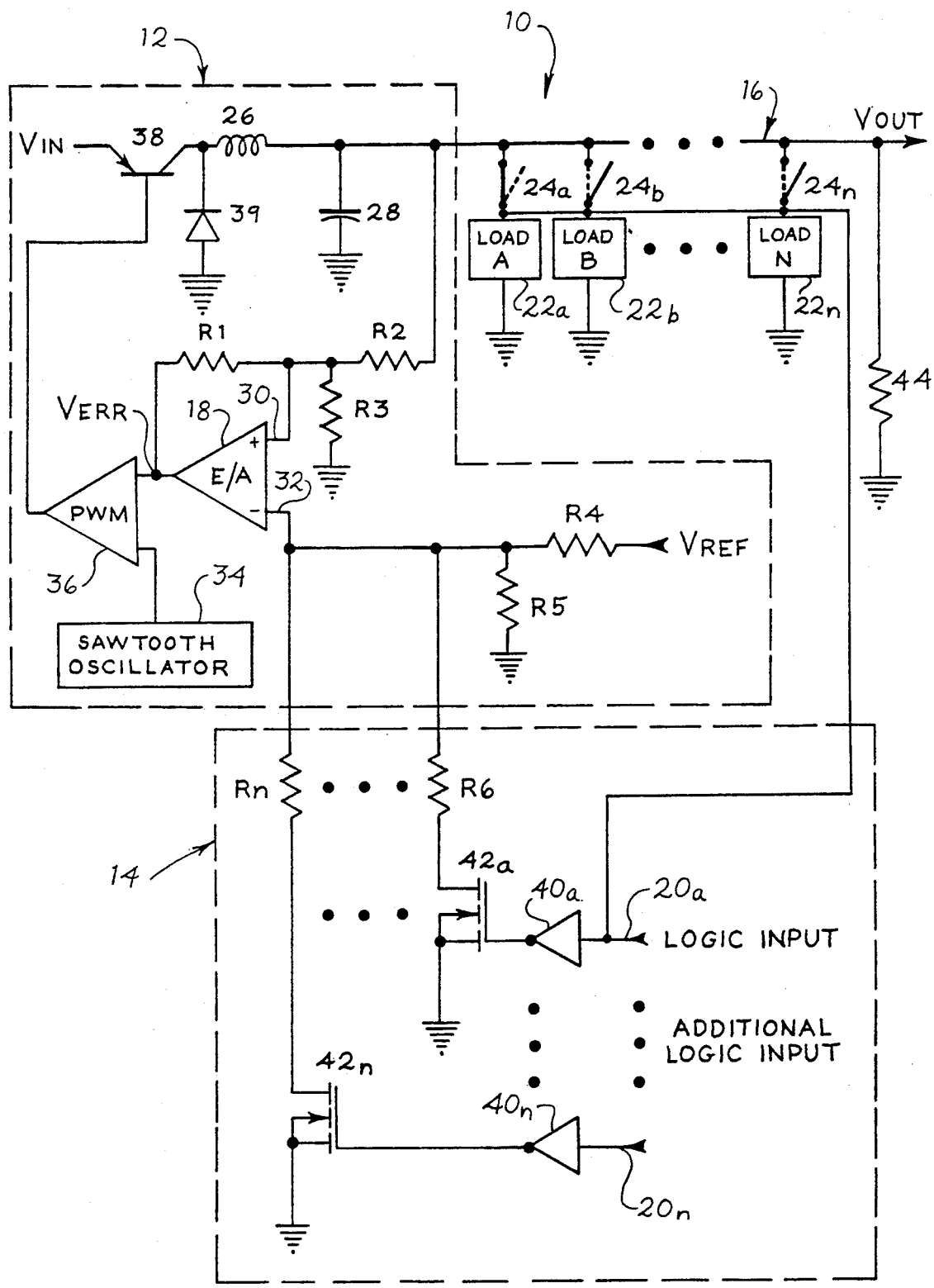
FIG. 2 is a circuit schematic of the present invention showing an embodiment which expands the number of selectable voltage output levels.

The output selection circuit 14 is expandable to enable the converter circuit 10 to output one of more than two selectable output voltages. FIG. 2 shows an expanded selectable output circuit 14. Resistors R6 through Rn are selectively brought into the circuit separately or in any parallel combination by means of the digital logic inputs 20a through 20n, inverters 40a through 40n, and FETs 42a through 42n. A different portion of the reference voltage is fed into the second input 32 of the error amplifier 18 for each combination of resistors brought into the circuit. Thus, for every combination of digital logic inputs, the converter circuit 10 is capable of providing a specific voltage output. In general, the converter is capable of providing any one of $2^n$ different output voltages, where n equals the number of digital logic inputs.

The circuit permits real time control of the regulated output voltage level which depends on the values chosen for the inductor 26 and the capacitor 28. Typically, component values will be near $10K\mu F$ for capacitor 28 and 200 $\mu H$ for inductor 26, which permit the control circuit to respond to load changes within 100 milliseconds. If the load connected to the output terminal 16 of the voltage converter increases, the output voltage level will be reduced at the output terminal 16. The time it takes for the control circuit to increase the output voltage to the desired level depends on how quickly the inductor-capacitor filter can be charged. Should the load decrease, the output voltage at terminal 16 will increase. The rate at which capacitor 28 discharges will determine the time it takes for the control circuit to decrease the output voltage to the desired level. The capacitor 28 discharges through the load connected to the output terminal 16 or an optimal discharge resistor 44. The discharge resistor 44 is permanently paralleled across the output terminal and ground. Alternatively, the discharge resistor is selectively engaged by well known means during the time it takes for the control circuit to decrease the output voltage to the desired level.

Accordingly, a switchable output voltage converter having selectable output circuit means has been described which may provide one of two predetermined output voltages. Further, the selectable output circuit means are expandable to enable the converter to provide any one of a plurality of predetermined output voltages.

I claim:

1. An incrementally variable DC power supply, having a terminal adapted to selectively provide a regulated DC output voltage from a DC input voltage, comprising:
    control circuit means operatively connected to a reference voltage and to said DC input voltage, said control circuit means including means to control said regulated DC output voltage in response to any one of a plurality of values of said reference voltage;
    output selection circuit means operatively connected to said reference voltage and to at least one of a plurality of digital logic inputs, having high and low levels said output selection circuit means including means to selectively alter the value of said reference voltage in response to said digital logic inputs, said reference voltage altering means being free of mechanical switching elements and comprising at least one switching transistor; and
    means to selectively and alternatively engage and disengage any one of a plurality of electrical loads connected to said terminal, said selective engagement and disengagement means being simultaneously with the means to selectively alter the value of the reference voltage, responsive to changes in the logic level of said digital logic inputs.

2. The power supply of claim 1, further comprising means to electrically engage and disengage electrical loads connected to said terminal.

3. The power supply of claim 2, wherein said means to electrically engage and disengage electrical loads is responsive to changes in the logic level of said digital logic inputs.

4. The power supply of claim 1, wherein said output selection circuit comprises:
    an inverter disposed intermediate said digital logic input and said switching transistor, said inverter responsive to changes in the logic level of said digital logic input and capable of activating or deactivating said switching transistor; and
    a resistor disposed intermediate said switching transistor and said control circuit.

5. The power supply of claim 1, wherein said DC input voltage is a rectified AC voltage.

6. The power supply of claim 4, wherein said control circuit means further comprises a filter network including a capacitor and an inductor to filter the output of said input switching transistor.

7. A method of selectively providing one of a plurality of regulated DC output voltages from an input voltage, comprising the steps of:
    providing a reference voltage;
    providing said input voltage;
    providing control circuit means operatively connected to said reference voltage and to said input voltage, said control circuit means including means to control said regulated DC output voltage in response to any one of a plurality of values of said reference voltage;
    providing output selection circuit means operatively connected to said reference voltage and to at least one of a plurality of digital logic inputs, having high and low levels said output selection circuit means including means to selectively alter the value of said reference voltage in response to said digital logic inputs, said reference voltage altering means being free of mechanical switching elements and comprising at least one switching transistor;
    selectively enabling at least one of said digital logic inputs to alter said value of said reference voltage;
    outputting one of said plurality of regulated DC output voltages;
    providing a plurality of electrical loads; and
    providing means to selectively and alternatively engage and disengage any one of said plurality of electrical loads simultaneously with the means to selectively alter the value of the reference voltage, in response to changes in the logic level of said digital logic inputs.

8. The method of claim 7, further comprising the steps of:
    providing at least one electrical load; and
    providing means to electrically engage and disengage said electrical loads in response to said digital logic inputs.

9. The method of claim 7, wherein said output selection circuit means comprises:
    an inverter disposed intermediate said digital logic input and said switching transistor, said inverter responsive to changes in the logic level of said digital logic input and capable of activating or deactivating said switching transistor; and
    a resistor disposed intermediate said switching transistor and said control circuit.

10. The method of claim 7, wherein said control circuit means further includes a filter network including a capacitor and an inductor to filter the output of said input switching transistor.

11. The power supply of claim 1, wherein said semiconductor switching element is a transistor.

12. The power supply of claim 1, wherein said semiconductor switching element is electrically connected directly to said digital logic inputs.

13. The power supply of claim 12, wherein said semiconductor switching element is an inverter.

14. The method of claim 7, wherein said semiconductor switching element is a transistor.

15. The method of claim 7, wherein said semiconductor switching element is electrically connected directly to said digital logic inputs.

16. The method of claim 15, wherein said semiconductor switching element is an inverter.

* * * * *